United States Patent [19]

Halmi

[11] 3,733,903

[45] May 22, 1973

[54] DIFFERENTIAL PRESSURE PRODUCING FLOW METER

[75] Inventor: Dezsoe Halmi, Cranston, R.I.

[73] Assignee: General Signal Corporation, Rochester, N.Y.

[22] Filed: Aug. 9, 1972

[21] Appl. No.: 279,155

Related U.S. Application Data

[63] Continuation-in-part of Ser. No. 144,802, May 19, 1971, abandoned.

[52] U.S. Cl. ....................................... 73/213, 138/44

[51] Int. Cl. ............................................... G01f 1/00

[58] Field of Search ........................... 73/213; 138/44

[56] References Cited

UNITED STATES PATENTS

| | | | |
|---|---|---|---|
| 1,850,030 | 3/1932 | Pardoe | 73/213 |
| 2,704,555 | 3/1955 | Dall | 138/44 |
| 2,868,013 | 1/1959 | Terrell | 73/213 |

OTHER PUBLICATIONS

R. G. West, Rectangular Tube Design, Instrument Practice, December 1961, P1547–1552.

*Primary Examiner*—Richard C. Queisser
*Assistant Examiner*—John P. Beauchamp
*Attorney*—Jeffrey S. Mednick and Milton E. Kleinman

[57] ABSTRACT

The disclosure concerns fluid flow metering devices of the differential pressure producing type comprising a tube of polygonal, preferably rectangular, cross section which defines a converging section which guides fluid to a throat. The converging section accelerates the fluid to throat velocity in two carefully controlled phases, each of which is terminated by the formation of a vena contracta, and the throat is equipped with a tap which senses true static pressure. The flow metering device affords a discharge coefficient on the order of 0.98 and preferably has a "2 sigma" uncalibrated accuracy of ±1 percent.

6 Claims, 3 Drawing Figures

21 13 14 22 11 16 14a 23 14b b 24 a 18 23 15b 24 17 19 15a 15

PATENTED MAY 22 1973
3,733,903
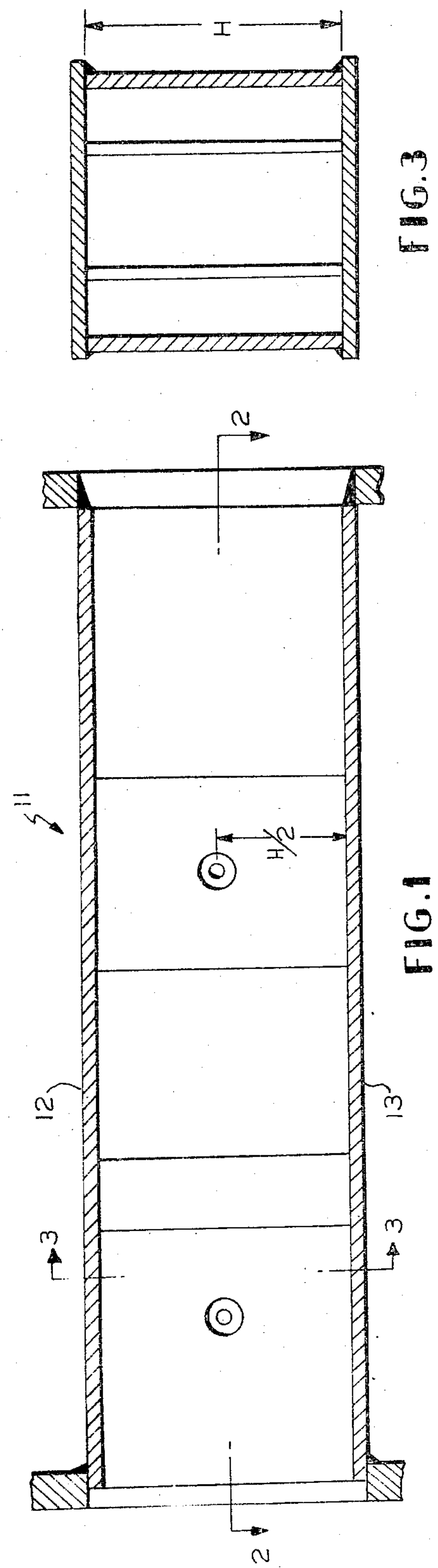
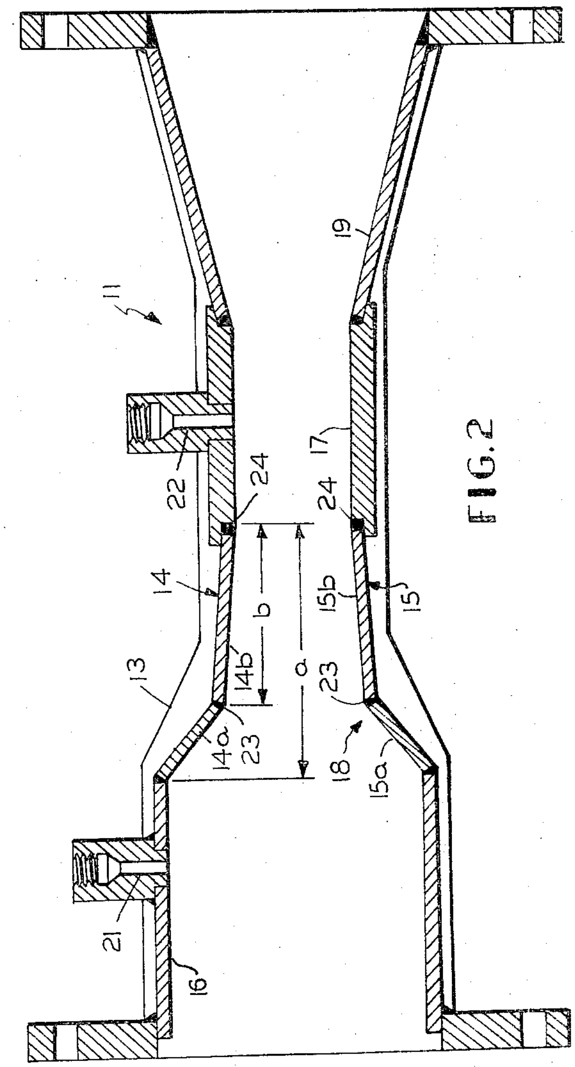
INVENTOR
DEZSOE HALMI
BY Dodge & Ostmann
ATTORNEYS

DIFFERENTIAL PRESSURE PRODUCING FLOW METER

CROSS-REFERENCE TO RELATED APPLICATION

This application is a continuation-in-part of U. S. application Ser. No. 144,802, filed May 19, 1971, now abandoned.

BACKGROUND AND SUMMARY OF THE INVENTION

A common flow meter of the differential pressure producing type comprises a tube having a large inlet section which is joined to a throat of reduced area by a converging section, and a pair of static pressure taps for sensing the static pressures in the inlet and throat sections. Perhaps the best known instrument of this type is the Herschel or classical Venturi (see "Fluid Meters," 5th Edition, 1959), American Society of Mechanical Engineers), which is noted for its large and stable discharge coefficient, and its small "2 sigma" accuracy tolerance. This meter, however, has a circular cross section, so its incorporation in a fluid handling system employing polygonal ducts requires use of transition duct sections. In most cases, this requirement is intolerable because the transition sections are complex and expensive, consume considerable space, and, unless very carefully designed, introduce flow pattern abnormalities which adversely affect the performance of the meter.

Although there is a need for a rectangular differential producer, the prior art furnishes little information regarding the design and performance of such an instrument. In fact, as far as I am aware, the following works are the only pertinent ones which have been published:

"Rectangular Tube Design — Part I" by R. G. West, Instrument Practice, December, 1961, pages 1547–1552.

"Shell Flow Meter Engineering Handbook," pages 109–111, Waltman Publishing Company of Delft, The Netherlands, 1958.

These articles, which evidently are based upon the same studies, indicate that known rectangular meters have unpredictable discharge coefficients, and may not be assigned a "2 sigma" accuracy tolerance of within ±5 percent. These disappointing results justify the consensus of experts in the art that use of rectangular differential producers should be avoided.

The object of this invention is to provide a high quality differential producer having a polygonal cross section. According to the invention, the new meter is made of planar walls and is distinguished by a throat which contains a static pressure tap positioned to sense true static pressure, and by a specially constructed converging section which accelerates the fluid to throat velocity in two carefully controlled phases, each of which is terminated by the formation of a vena contracta. For a "2 sigma" tolerance of ±1 percent, the total accelerating distance, i.e., the axial length of the converging section should be between $\sqrt{A_I}\,(0.67–0.2B)$ and $1.1\sqrt{A_I}\,(0.67–2B)$, and the downstream and more critical portion of the section should have an axial length between $0.56B\sqrt{A_I}$ and $0.6B\sqrt{A_I}$, where $A_I$ is the cross sectional area of the tube inlet, and B is the beta ratio of the tube (i.e., the ratio of the square roots of the cross sectional areas of the throat and the inlet). The walls which define the two portions of the converging section may meet at a sharp edge. The new tube not only is considerably shorter than a classical venturi having the same inlet area and beta ratio, but its performance matches very closely that of circular Universal Tubes constructed in accordance with the teachings in application Ser. No. 48,341, filed June 22, 1970, now U.S. Pat. No. 3,686,946. In particular, test results indicate that the new meter has a discharge coefficient of 0.98 over the beta range of 0.3 to 0.75, and that it may legitimately be assigned a "2 sigma" uncalibrated accuracy tolerance of ±1 percent based on the statistical data for the circular Universal Tube. Moreover, this tube has a "quiet" or nonpulsating differential, and an adiabatic expansion factor Y which is capable of accurate calculation. In short, the invention provides a truly universal polygonal differential producer.

BRIEF DESCRIPTION OF THE DRAWING

The preferred embodiment of the invention is described herein in detail with reference to the accompanying drawing in which:

FIG. 1 is an axial sectional view of the improved rectangular differential producer.

FIGS. 2 and 3 are sectional views taken on lines 2—2 and 3—3, respectively, of FIG. 1.

DESCRIPTION OF PREFERRED EMBODIMENT

As shown in the drawing, the invention is embodied in a flange ended tube 11 comprising flat, parallel top and bottom walls 12 and 13, respectively, and a pair of identical, shaped side walls 14 and 15, each of which is composed of flat plates. These walls are welded together to form a duct of rectangular cross section which includes an inlet section 16 of constant cross sectional area, a throat 17 of constant, but smaller area, an interconnecting converging section 18, and a diffuser section 19. The design of the diffuser forms no part of the invention itself and may even be omitted in cases where good head recovery is not desired. The inlet and throat sections 16 and 17 are provided with static pressure taps 21 and 22, respectively, which furnish to the secondary portion (not shown) of the complete flow meter the pressures from which the rate of flow is derived. These taps are constructed in the conventional manner.

Converging section 18 comprises an upstream portion defined by side plates **14*a* and 15*a*, and a downstream portion defined by side plates 14*b* and 15*b*; each of the plates 14*b* and 15*b* joining the adjacent plates along edges 23 and 24** which are sharp, or at least not intentionally rounded. For a "2 sigma" tolerance of ±1 percent, the overall axial length *a* of section 18 should be between $\sqrt{A_I}(0.67–0.2B)$ and $1.1\sqrt{A_I}\,(0.67-0.2B)$, and the axial length *b* of the downstream portion of the section should be between $0.56B\sqrt{A_I}$ and $0.6B\sqrt{A_I}$, where $A_I$ is the cross sectional area of inlet section 16, and B is the Beta ratio of the tube 11 (i.e., the ratio of the square roots of the cross sectional areas of throat 17 and inlet section 16). For best correspondence between the performances of rectangular tube 11 and its circular counterpart of application Ser. No. 48,341 i.e., a circular Universal Tube having the same inlet area and beta ratio), the dimensional relationships just mentioned should be followed very closely. However, if a "2 sigma" tolerance of ±5 percent is acceptable, it is only necessary to maintain axial length *a* between $0.5\sqrt{A_I}(0.67–0.2B)$ and 2.0

$\sqrt{A_I}(0.67-0.2B)$, and maintain axial length $b$ between $0.3B\sqrt{A_I}$ and $1.2B\sqrt{A_I}$.

The sharp corners 23 cause the fluid leaving the upstream portion of section 18 to form a vena contracta and then expand and re-attach to the walls **14*b* and 15*b*. Similarly, the fluid leaving section 18 forms a vena contracta at edges 24 and then re-attaches to the tube walls in throat 17. As explained in application Ser. No. 48,341, these vena contractas have the effect of normalizing the flow pattern (i.e., the velocity distribution across the flowing stream), and thereby tend to make the discharge coefficient of the tube insensitive to the effects of upstream conditions, such as bends in the ducting, valves, and changes in duct cross section or surface roughness. Since the invention requires that throat tap 22 sense true static pressure, the axial spacing between the tap and edges 24** must be sufficient to insure that the flow has reattached to the throat wall before it passes the tap.

Throat tap 22 preferably is located in a tube wall which has a portion upstream of throat 17 which changes flow direction, and is positioned midway between the side edges of that wall. Thus, in the illustrated embodiment, this tap is located in side wall 14 and is spaced a distance of H/2 from each of the top and bottom walls 12 and 13. In addition, the tap should be located a sufficient distance upstream of the diffuser entrance to insure that the pressure it senses is not affected by back effects of the diffuser. Experience indicates that a location in the middle of the throat is acceptable. This arrangement of the tap provides the closest correspondence between the discharge coefficients of the rectangular meter and the circular Universal Tube, and minimizes pulsations in the sensed pressure.

The inlet tap 21 also is intended to sense true static pressure; therefore it should be located in one of the shaped side walls 14 and 15 midway between the top and bottom walls, and spaced axially a sufficient distance from the inlet of tube 11 and section 18 to avoid adverse influences from the junction of the tube and the upstream ducting and back effects from the converging section.

The cross sectional shape of tube 11 is selected to suit the shape of the ducting system in which it is inserted, but, at any station along its length, it should always have an even number of sides, opposed sides of equal length, and equal corner angles. In the case of a rectangular section, which is the normal shape, the ratio of the lengths of the sides can be between 10:1 and 1:1, provided that neither width nor height is less than 1 inch. It is immaterial, as far as performance is concerned, that tube cross section changes from an oblong at the inlet to a square at the throat or vice versa, or that the inlet and throat sections are oblongs whose major dimensions are not aligned. Moreover, except for the matter of increased cost of manufacture, it makes no difference whether two or all four of the walls 12–15 are shaped. However, close correspondence between the discharge coefficients of the new tube and the circular Universal Tube requires that all cross sections along the length of tube 11 be symmetrical about the same set of perpendicular axes (e.g. the horizontal and vertical axes in the illustrated embodiment). In other words, opposing tube walls 12 and 13 or 14 and 15 must be identical.

The performance of the new differential producer is insensitive to its orientation in space. However, if the illustrated tube 11, which has only two shaped walls, is installed in a horizontal duct, it is recommended that it be so oriented that the parallel walls 12 and 13 lie in horizontal planes. This arrangement encourages self-scouring, i.e., it prevents accumulation in converging section 18 of foreign material which may settle from the flowing fluid medium.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A flow metering device of the differential pressure producing type including a. a tube of polygonal cross section which defines a throat and a converging section for guiding fluid thereto from an inlet region of larger cross section, b. the converging section comprising at least one pair of opposing converging walls each of which has upstream and downstream portions which join along an edge, and the throat comprising opposing, parallel walls which join said downstream portions along edges, c. the length of the converging section being between $0.5\sqrt{A_I}(0.67-0.2B)$ and $2.0\sqrt{A_I}(0.67-0.2B)$, and the length of said downstream portion being between $0.3B\sqrt{A_I}$ and $1.2B\sqrt{A_I}$, where $A_I$ is the cross sectional area of the inlet region, and B is the ratio of the square roots of the cross sectional areas of the throat and the inlet region; and d. a pressure tap in a throat wall located so as to sense true static pressure at a point where flow is attached to that wall.

2. A flow metering device as defined in claim 1 in which said tube is of rectangular cross section.

3. A flow metering device as defined in claim 1 in which the length of the converging section is between $\sqrt{A_I}(0.67-0.2B)$ and $1.1\sqrt{A_I}(0.67-0.2B)$ and the length of the downstream portion is between $0.56B\sqrt{A_I}$ and $0.6B\sqrt{A_I}$.

4. A flow metering device as defined in claim 2 in which the length of the converging section is between $\sqrt{A_I}(0.67-0.2B)$ and $1.1\sqrt{A_I}(0.67-0.2B)$ and the length of the downstream portion is between $0.56B\sqrt{A_I}$ and $0.6B\sqrt{A_I}$.

5. A flow metering device as defined in claim 4 in which the pressure tap is located in the center of one of said parallel throat walls which join said downstream portion.

6. A flow metering device as defined in claim 4 in which a. the tube also has an inlet section which is joined to the throat by said converging section and which includes opposing parallel walls which join with the upstream portions of said converging walls; and b. one of said parallel walls of the inlet section contains a pressure tap positioned to sense true static pressure.

* * * * *